No. 649,182. Patented May 8, 1900.
C. H. STEARN & C. F. TOPHAM.
APPARATUS FOR PRODUCING RADIATION AND LIGHT BY ELECTRICITY.
(Application filed Jan. 20, 1899.)
(No Model.) 2 Sheets—Sheet 1.
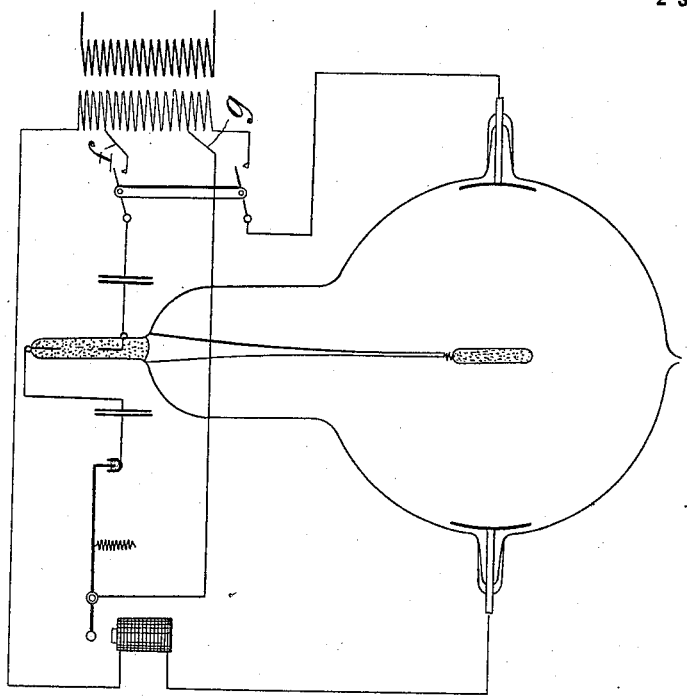
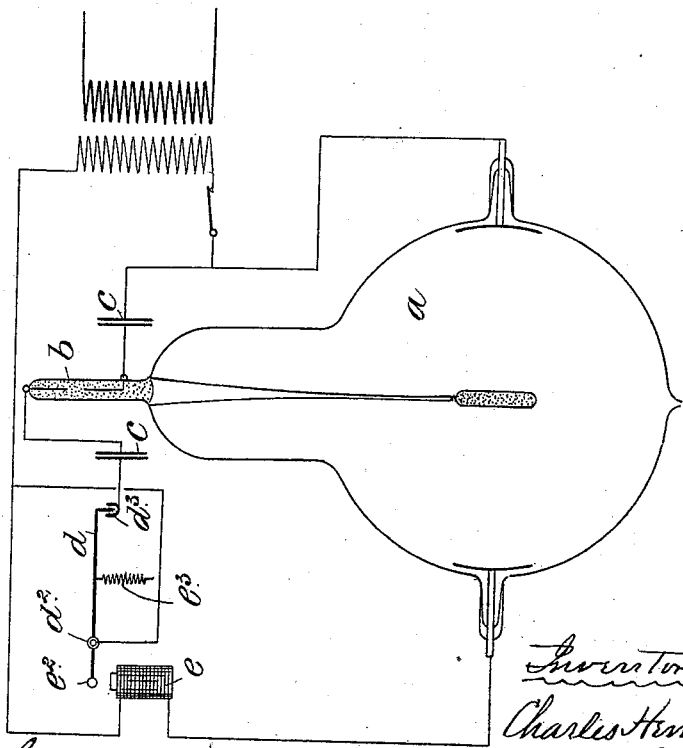

No. 649,182. Patented May 8, 1900.
C. H. STEARN & C. F. TOPHAM.
APPARATUS FOR PRODUCING RADIATION AND LIGHT BY ELECTRICITY.
(Application filed Jan. 20, 1899.)
(No Model.) 2 Sheets—Sheet 2.
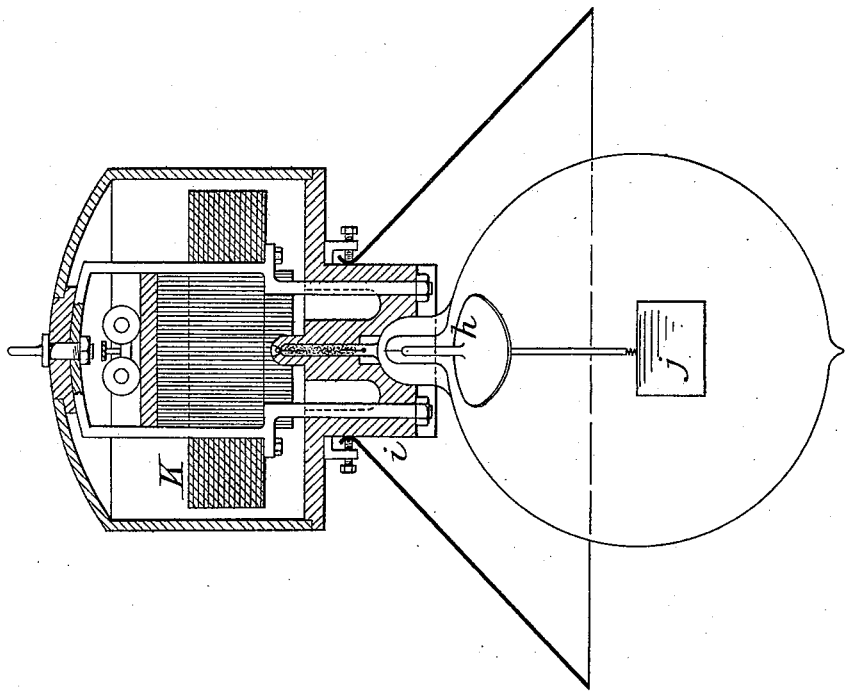
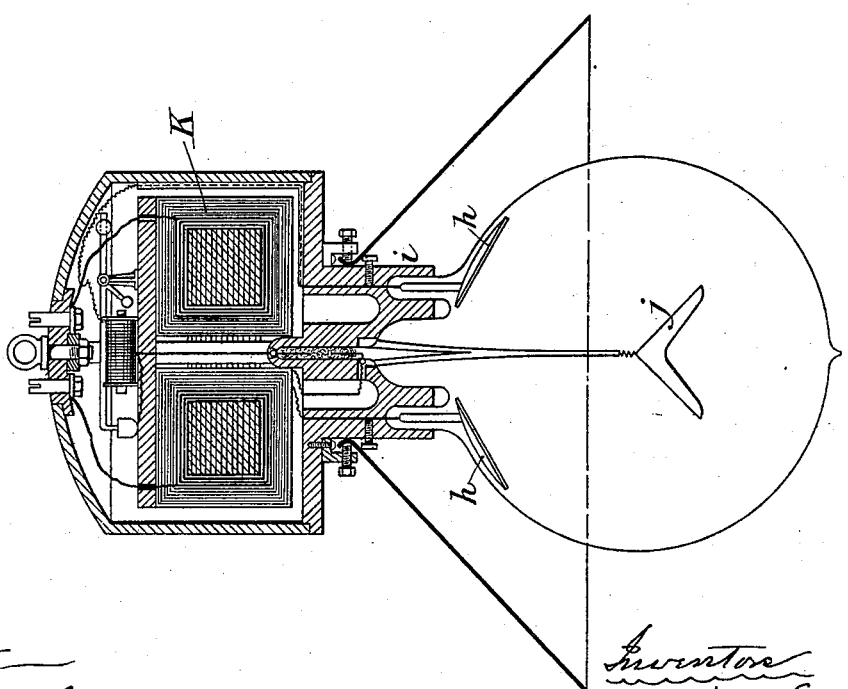

UNITED STATES PATENT OFFICE.

CHARLES H. STEARN AND CHARLES F. TOPHAM, OF LONDON, ENGLAND; SAID TOPHAM ASSIGNOR TO SAID STEARN.

APPARATUS FOR PRODUCING RADIATION AND LIGHT BY ELECTRICITY.

SPECIFICATION forming part of Letters Patent No. 649,182, dated May 8, 1900.

Application filed January 20, 1899. Serial No. 702,842. (No model.)

*To all whom it may concern:*

Be it known that we, CHARLES HENRY STEARN and CHARLES FREDERICK TOPHAM, engineers, subjects of the Queen of Great Britain and Ireland, and residents of 47 Victoria street, Westminster, London, England, have invented certain new and useful Improvements in Apparatus for Producing Radiation and Light by Electricity, (for which we have applied for a patent in Great Britain, No. 14,059, dated June 25, 1898,) of which the following is a specification.

In describing our invention, which relates principally to improvements on an invention for which Letters Patent No. 613,090, dated October 25, 1898, have been granted to us, we will refer to the accompanying drawings.

Figures 1 and 2 are diagrams showing arrangements according to our present improvements, and Figs. 3 and 4 are sections at right angles to each other of a lamp arranged according to our present invention.

In the shunt-circuit $z$, Fig. 1, of an exhausted vessel $a$, furnished with a sparking-chamber $b$, as described in the specification of the said Letters Patent, we, according to our present invention, interpose on each side of the sparking-chamber a condenser $c$, and in the same circuit is an interrupter $d$, which is actuated by an electromagnet $e$ in the principal circuit $y$ of the exhausted vessel $a$. (See Fig. 1.) The circuit $y$ has connections through the walls of the chamber A with electrodes $x$ $x$.

$w$ is the body, which is to be rendered luminous by the action of the cathode-rays. It is suspended within the chamber $a$ and is preferably a material, such as refractory oxid of thorium or other suitable refractory oxids or earths, which can be rendered incandescent by means of currents which are practically available. As in our patent above referred to, the sparking-chamber $b$ (which communicates with the vessel or bulb $a$) contains a substance—such, for example, as chlorate of potash or an ammonium salt—which when an electric spark is passed through it evolves small traces of air or other gas, which pass into the chamber $a$ and act to render constant or practically constant the condition of the vacuum or attenuation of the air or gas in said chamber. In this connection it is to be understood that if an electric current of high potential be passed through a vessel exhausted of air or other gas and between electrodes suitably shaped, one or both being concave, a solid body placed at or near the center of curvature of the cathode becomes incandescent at a certain stage of exhaustion or attenuation of the air or gas, and at a higher degree of vacuum or attenuation of the air or gas in the said vessel the said solid body becomes phosphorescent to a greater or less degree, according to the nature of the solid body employed. At a still higher vacuum or attenuation of the said air or gas certain substances emit or direct the rays known as "Röntgen" or "X" rays. On account of the speedy rise in the degree of vacuum or attenuation of the air or gas in the said vessel, owing to the absorption of the air or gas present, permanent effects of radiation in the required manner are not attainable unless means be provided whereby the condition of the vacuum or attenuation of the air or gas in the said vessel is rendered constant or practically constant. Hence the necessity of providing means for replenishing the air or gas in the chamber $a$.

As soon as the current in the principal circuit $y$ of the exhausted vessel $a$ rises above the normal, (owing to diminished resistance in the vessel $a$,) caused by the lowering of the vacuum therein due to air or gas supplied from chamber $b$, the electromagnet $e$ attracts its armature $e^2$ sufficiently to overcome the resistance of a counterbalancing-spring $e^3$ or weight and interrupts the current which charges the condensers in the shunt-circuit. This interruption is caused by the attraction of the armature causing the lever carrying it to turn on the center $d^2$ and lift the contacts from the mercury-cups $d^3$. When the current in the principal circuit falls below the normal, (owing to increase of resistance in the vessel $a$,) the armature $e^2$ is drawn back by the spring $e^3$, (or weight,) and the condensers $c$ charge and cause a succession of sparks through the sparking-chamber $b$ during the period that the deficit of current continues.

To supply a number of lamps in parallel from the same high-tension circuit, we sometimes interpose an exterior resistance in the principal circuit of each lamp.

Instead of causing the sparking to take place by means of a shunt from the principle circuit a separate generator or a separate transformer or branch of a transformer at a tension different from that in the principle circuit may be employed to give the current for the sparking, the interrupter in the sparking-circuit being actuated by the electromagnet in the principal circuit of the exhausted vessel as before. In this case a switch should be provided to break both circuits simultaneously when the lamp is put out of action. In carrying out this idea two wires may be brought from two intermediate points of the secondary winding of the transformer, as at $f\ g$ in Fig. 2, and connected with the sparking-chamber $b$, so as to supply current to it at a lower potential difference than that supplied to the principal circuit of the lamp or exhausted vessel which is connected to the terminals of the transformer. The circuit formed by wires $f$ and $g$ includes condensers $c\ c$ and an interrupter $d$, operated by an electromagnet $e$ in the main circuit $y$, all as in Fig. 1. In Fig. 2 a double switch $t$ is provided for simultaneously breaking the circuits $f$, $g$, and $y$ when the lamp is put out of operation. When each lamp is supplied by a separate transformer, the regulating-magnet may be interposed in the primary instead of the secondary circuit of the transformer.

By suitable winding on a transformer an initial high potential may be supplied sufficient to cause the current to start through the high resistance of the lamp when cold and to fall to the desired extent as current is taken by the lamp.

When the electrical radiation is required for the purpose of producing light by the incandescence of a solid body, the electrodes may more conveniently be placed near the end of the bulb or exhausted vessel, as shown at $h$ in Figs. 3 and 4, so as to be capable of attachment to the leading wires by the cap or fitting $i$. The incandenscing body $j$ should then be made in a triangular or V shape with each side of the V opposite to one of the metallic curved or cup-shaped electrodes $h$. A part or parts of the bulb or exhausted vessel may be silvered, if desired, to reflect the rays in any required direction, or the incandenscing body may be made in spherical, hemispherical, or other convenient form, and more than two concave electrodes may be used within the lamp, or if a more elongated incandenscing surface be desired the electrodes may have a cylindrical form.

The interposition of the condenser on each side of the sparking-chamber prevents a discharge from occurring between the sparking-chamber and the electrodes in the interior of the lamp. The same object may also be effected by interposing between the aperture of the sparking-chamber and the interior of the lamp a long and narrow tube, through which the current will pass with difficulty owing to the small section of the tube. In this case the condensers may be dispensed with.

For convenience in use where there is a transformer for each lamp we sometimes attach the transformer directly to the lamp as a base or fitting, as shown at $k$ in Figs. 3 and 4, or we may attach the transformer as part of a chandelier from which a group of lamps is branched.

The foregoing description presumes that an alternating electric current is used, but a continuous or direct current may be used with one condenser and one concave electrode.

What we claim, and desire to secure by Letters Patent of the United States, is—

1. In a lamp or illuminating device for giving light by the action of cathode-rays on an anticathode, an exhausted vessel, a principal circuit having two terminals inclosed in said vessel, an anticathode inclosed by said vessel and made of a material capable of being rendered incandescent by the cathode-rays, a sparking-chamber communicating with the exhausted vessel, a material in said chamber capable of evolving air or gas when a current of electricity is passed through said chamber, an auxiliary circuit having terminals in said sparking-chamber for emitting sparks upon the closing of the said circuit, and an interrupter operated by fluctuations of the resistance in the principal circuit for opening and closing the auxiliary circuit.

2. In an apparatus of the kind described, the combination with a sparking-chamber containing a material adapted to evolve air or gas under the action of an electric current, of a circuit having terminals in said sparking-chamber, and a condenser in said circuit.

3. In an apparatus of the kind described, the combination with a sparking-chamber containing a material adapted to evolve air or gas under the action of an electric current, of a circuit having terminals in said sparking-chamber, a condenser in said circuit, and an interrupter for opening and closing the circuit.

4. In apparatus for producing radiation and light by means of cathode-rays, an exhausted vessel, a material adapted to be rendered incandescent suspended therein, electrodes in said vessel, a principal circuit including said electrodes and energized by the secondary winding of a transformer, a sparking-chamber communicating with the exhausted vessel, a material in said chamber adapted to evolve air or gas upon the passage of an electric current through the chamber, an auxiliary circuit having terminals in the sparking-chamber and energized by the secondary winding of a transformer, and an interrupter actuated by the current of the principal circuit to make and break the auxiliary circuit.

5. In apparatus for producing radiation and light by means of cathode-rays, an exhausted vessel, a material adapted to be rendered incandescent suspended therein, electrodes in said vessel, a principal circuit including said electrodes and energized by the secondary winding of a transformer, a sparking-chamber communicating with the exhausted vessel, a material in said chamber adapted to evolve air or gas upon the passage of an electric current through the chamber, an auxiliary circuit having terminals in the sparking-chamber and energized by the secondary winding of a transformer, an interrupter in the auxiliary circuit, and an electromagnet in the principal circuit for operating said interrupter for making and breaking the auxiliary circuit.

6. In apparatus for producing radiation and light by means of cathode-rays, an exhausted vessel, a material adapted to be rendered incandescent suspended therein, electrodes in said vessel, a principal circuit including said electrodes and energized by the secondary winding of a transformer, a sparking-chamber communicating with the exhausted vessel, a material in said chamber adapted to evolve air or gas upon the passage of an electric current through the chamber, an auxiliary circuit having terminals in the sparking-chamber and energized by a section of the secondary winding of the transformer which energizes the principal circuit, and an interrupter actuated by the current of the principal circuit for opening and closing the auxiliary circuit.

In testimony whereof we have signed this specification in the presence of two subscribing witnesses.

C. H. STEARN.
C. F. TOPHAM.

Witnesses:
WILLIAM FREDERICK UPTON,
RICHARD BUNDY.